US009258679B1

(12) United States Patent
Williams et al.

(10) Patent No.: US 9,258,679 B1
(45) Date of Patent: Feb. 9, 2016

(54) MODIFYING A HISTORY OF GEOGRAPHIC LOCATIONS OF A COMPUTING DEVICE

(71) Applicant: Google Inc., Mountain View, CA (US)

(72) Inventors: Brian Patrick Williams, Mountain View, CA (US); Marc Stogaitis, San Mateo, CA (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 13/941,726

(22) Filed: Jul. 15, 2013

(51) Int. Cl.
H04W 4/02 (2009.01)
(52) U.S. Cl.
CPC ................................ H04W 4/028 (2013.01)
(58) Field of Classification Search
CPC .................................. H04W 4/02; H04W 4/04
USPC ........... 455/456.1, 456.2, 456.3, 456.5, 456.6
See application file for complete search history.

(56) References Cited

U.S. PATENT DOCUMENTS

| 6,754,470 | B2* | 6/2004 | Hendrickson ....... H04L 12/2602 455/405 |
| 8,301,158 | B1 | 10/2012 | Thomas |
| 2007/0150192 | A1* | 6/2007 | Wakamatsu et al. .......... 701/213 |
| 2008/0076450 | A1* | 3/2008 | Nanda .................... G01D 21/00 455/456.1 |
| 2009/0075676 | A1* | 3/2009 | Park et al. .................. 455/456.3 |
| 2012/0258734 | A1* | 10/2012 | Takahashi et al. ......... 455/456.1 |
| 2012/0322460 | A1* | 12/2012 | Liu et al. .................... 455/456.1 |
| 2013/0273939 | A1* | 10/2013 | Cho ....................... H04W 64/00 455/456.2 |
| 2014/0120944 | A1* | 5/2014 | Tarkkala ............... H04W 4/027 455/456.1 |
| 2014/0171102 | A1* | 6/2014 | Murphy et al. ............ 455/456.1 |
| 2014/0274111 | A1* | 9/2014 | Edge et al. ................. 455/456.1 |

FOREIGN PATENT DOCUMENTS

EP 2308217 4/2011

* cited by examiner

Primary Examiner — Christopher M Brandt
(74) Attorney, Agent, or Firm — McDonnell Boehnen Hulbert & Berghoff LLP

(57) ABSTRACT

Methods and systems for modifying a location history of a computing device are described. An example method may include receiving sensor data collected by one or more sensors of a computing device, and receiving a history of geographic locations of the computing device determined based on the sensor data collected by the computing device and additional data from one or more sources. The method may also include receiving updated additional data from the one or more sources, and reprocessing at least a portion of the sensor data with the updated additional data to determine one or more updates to the history of geographic locations of the computing device. The method may further include modifying the history of geographic locations of the computing device based on the one or more updates to provide an updated history of geographic locations of the computing device.

20 Claims, 5 Drawing Sheets

MODIFYING A HISTORY OF GEOGRAPHIC LOCATIONS OF A COMPUTING DEVICE

BACKGROUND

Unless otherwise indicated herein, the materials described in this section are not prior art to the claims in this application and are not admitted to be prior art by inclusion in this section.

A location of a computing device can be determined using many different techniques including based either on Global Positioning System (GPS) data or on data associated with a wireless access point, such as a cellular base station or an 802.11 access point. For example, a mobile computing device may receive a GPS signal and responsively determine its position on the face of the Earth (e.g. an absolute location). In a different example, a mobile computing device may receive a signal from either a cellular base station or an 802.11 access point. The cellular base station or an 802.11 access point may estimate an exact location. Based on the location of either the cellular base station or an 802.11 access point, the mobile computing device can calculate its exact position.

Within some instances, a localization of a mobile computing device may occur either via use of data from multiple different networks. Many location based services can be provided to a mobile computing device based on determining the location of the mobile computing device.

SUMMARY

In one example, a method is provided that includes receiving sensor data collected by one or more sensors of a computing device, receiving a history of geographic locations of the computing device determined based on the sensor data collected by the computing device and additional data from one or more sources, and receiving updated additional data from the one or more sources. The method also includes reprocessing at least a portion of the sensor data with the updated additional data to determine one or more updates to the history of geographic locations of the computing device, and modifying the history of geographic locations of the computing device based on the one or more updates to provide an updated history of geographic locations of the computing device.

In another example, a computer readable storage medium having stored therein instructions, that when executed by a device, cause the device to perform functions is provided. The functions comprise receiving sensor data collected by one or more sensors of a computing device, receiving a history of geographic locations of the computing device determined based on the sensor data collected by the computing device and additional data from one or more sources, and receiving updated additional data from the one or more sources. The functions also comprise reprocessing at least a portion of the sensor data with the updated additional data to determine one or more updates to the history of geographic locations of the computing device, and modifying the history of geographic locations of the computing device based on the one or more updates to provide an updated history of geographic locations of the computing device.

In still another example, a device is provided that comprises at least one processor, and computer-readable medium, configured to store instructions, that when executed by the processor, cause the device to perform functions. The functions comprise receiving sensor data collected by one or more sensors of a computing device, receiving a history of geographic locations of the computing device determined based on the sensor data collected by the computing device and additional data from one or more sources, and receiving updated additional data from the one or more sources. The functions also comprise reprocessing at least a portion of the sensor data with the updated additional data to determine one or more updates to the history of geographic locations of the computing device, and modifying the history of geographic locations of the computing device based on the one or more updates to provide an updated history of geographic locations of the computing device.

In still another example, a system is provided that comprises a means for receiving sensor data collected by one or more sensors of a computing device, a means for receiving a history of geographic locations of the computing device determined based on the sensor data collected by the computing device and additional data from one or more sources, and a means for receiving updated additional data from the one or more sources. The system also includes a means for reprocessing at least a portion of the sensor data with the updated additional data to determine one or more updates to the history of geographic locations of the computing device, and a means for modifying the history of geographic locations of the computing device based on the one or more updates to provide an updated history of geographic locations of the computing device.

These as well as other aspects, advantages, and alternatives, will become apparent to those of ordinary skill in the art by reading the following detailed description, with reference where appropriate to the accompanying figures.

DETAILED DESCRIPTION

Figure 1:
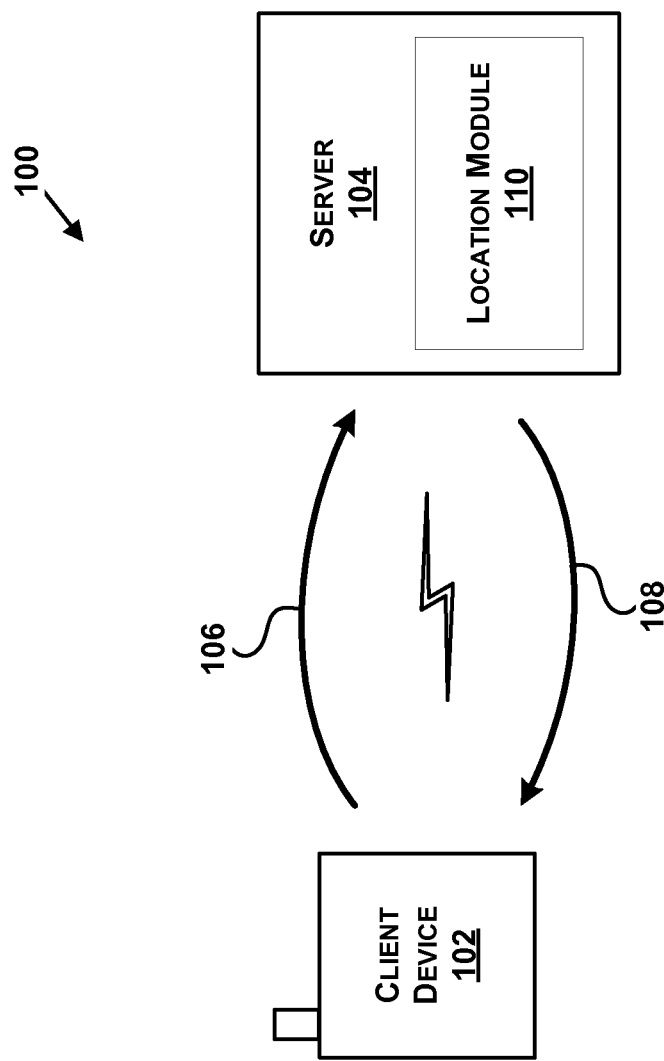
FIG. 1 illustrates an example communication system in which an example method may be implemented.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a location history of a computing device can be retroactively adjusted or determined based on data not known at the time of a location determination, such as subsequent location data or updated positioning of nodes of a network.

Within examples, a computing device may be configured to perform an instantaneous location determination to provide location data moment to moment, and also then store raw measurements from the sensors that are used to determine the location data. A location history includes a series of snapshots of previously live minute to minute data. The raw measurement data that is collected instantaneously and stored can be reprocessed at a later time to improve an accuracy of the location history. For example, at a time of performing a location determination, a subsequent location of the computing device is not known. Based on the later acquired subsequent location, a previous location may be adjusted or fine-tuned to be more accurate.

In some examples, adjustment of location history estimate may be performed by smoothing the data through use of Viterbi algorithms, smoothing and mapping algorithms, or other bundle adjustments.

The collected sensor data may include data from WiFi sensors, such as WiFi scans, that indicate relative positions of the computing device to any WiFi access points. A position of a WiFi access point may not be up to date, and so if an access point has been moved, the WiFi scan data may be inaccurate. Post-processing of such collected location data can include determining an updated position of WiFi access points to correct the location history of the computing device. In other examples, post-processing can include determining supplemental position data of satellites that is published for a GPS system, and correcting raw GPS data based on the published data.

Post-processing may also include identifying which of the collected location data may be in doubt or not highly trusted. For example, metadata associated with the collected location data may indicate a signal strength of a WiFi scan or of a GPS signal, and when the signal strength is low or less than a threshold, such collected location data may be in doubt or less likely to be highly accurate. Collected location data identified in this way may be further processed for correction.

The post-processed data may be representative of a more accurate detailed location history of the computing device. The location history may be indicative of actions of a user. For example, a user may be at a coffee shop, but outside of a coverage area of any node of a network. Thus, a location determination may not be accurate at the instantaneous time in the coffee shop. Once the user leaves the coffee shop, and the location determination is successful, the location history is incomplete. Following post-processing, the location history may be updated to be more accurate to result in a more accurate location history of the user. Such location history can be useful to provide location-based services to the user.

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, or tablet computing device, etc., that is configured to transmit data 106 to or receive data 108 from the server 104 in accordance with the method and functions described herein. The client device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to or receive data 106 from the client device 102. The server 104 may include a location module 110 which may be configured to process the data 106 received from the client device 102 to determine a locations (present and historical) associated with the client device 102.

The data 106 received by the server 104 from the client device 102 may take various forms. For example, the client device 102 may provide information indicative of a location of the client device 102, movement of the client device 102, or inputs from a user of the client device 102. The server 104 may then process the data 106 to identify a location history that matches to the received data.

The data 108 sent to the client device 102 from the server 104 may take various forms. For example, the server 104 may send to the client device 102 an indication of location history, updated location history information, or information based on the locations of the device.

Figure 2:
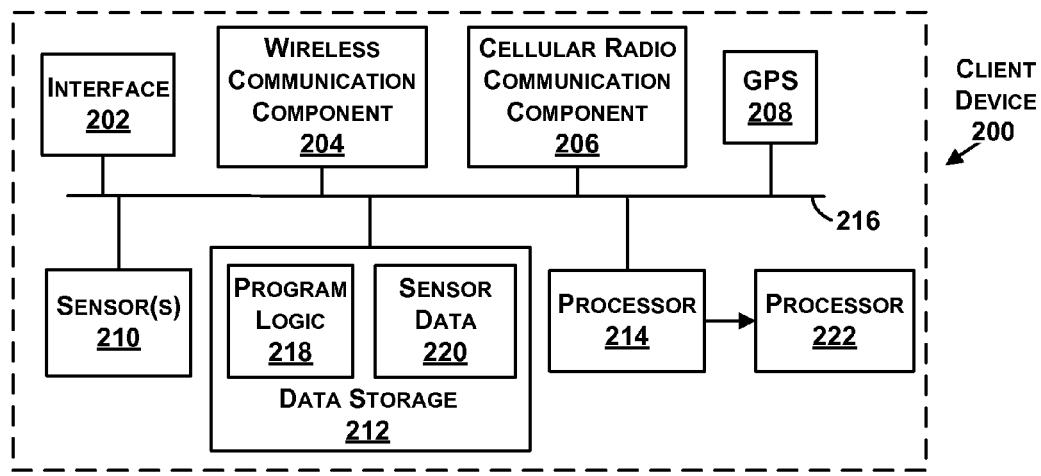
FIG. 2 illustrates a schematic drawing of an example device.

FIG. 2 illustrates a schematic drawing of an example device 200. In FIG. 2, the computing device takes a form of a client device 200. In some examples, some components illustrated in FIG. 2 may be distributed across multiple computing devices. However, for the sake of example, the components are shown and described as part of one example client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2 may be linked together by a communication link 216. The client device 200 may also include hardware to enable communication within the client device 200 and between the client device 200 and another computing device (not shown), such as a server entity. The hardware may include transmitters, receivers, and antennas, for example.

The interface 202 may be configured to allow the client device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 206, the cellular radio communication component 206, or the GPS 208. For instance, the processor 214 may use a location-determination algorithm to determine a location of the client device 200 based on a presence and/or location of one or more known wireless access points within a wireless range of the client device 200. In one example, the wireless location component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200. Example sensors include an accelerometer, gyroscope, pedometer, light sensors, microphone, camera, or other location and/or context-aware sensors.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200. Example methods described herein may be performed individually by components of the client device 200, or in combination by one or all of the components of the client device 200. In one instance, portions of the client device 200 may process an audio signal and provide an output internally in the client device 200 to the processor 222, for example. In other instances, portions of the client device 200 may process an audio signal and provide outputs externally to other computing devices.

Figure 3:
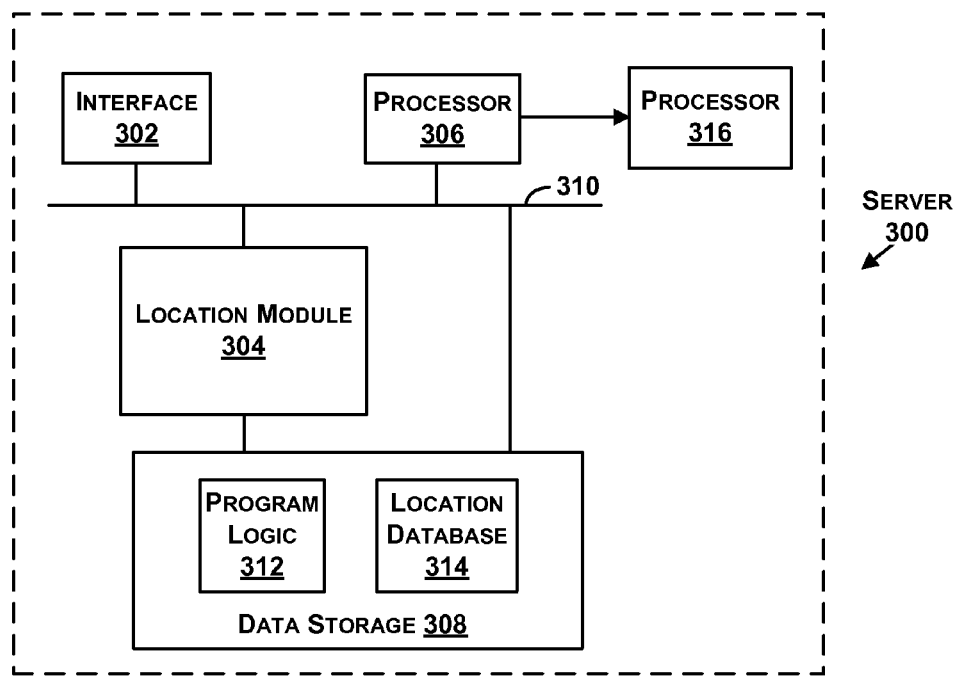
FIG. 3 illustrates a schematic drawing of another example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and determine an geographic location of the client device. The determination may be based on outputs of an accelerometer, gyroscope, or other sensors of the client device, as well as based on location determinations of the client device. The location module 304 may further be configured to determine and store a history of locations of the client device for later reprocessing based on updated data pertaining to networks or information used to the determine the locations.

The data storage 308 may store program logic 312 that can be accessed and executed by the processor 306. The data storage 310 may also a location database 314 that can be accessed by the processor 306 as well, for example, to retrieve information regarding wireless access points, locations of satellites in a GPS network, floor plans of a building, etc., or any other type of information useful for determining a location of a client device.

The server is illustrated with a second processor 316 which may be an application specific processor for input/output functionality. In other examples, functions of the processor 306 and the processor 316 may be combined into one component.

Within examples, measurements collected from various sensors of a device (such as WiFi components, GPS sensors, and inertial sensors) can be combined with information from external databases (such as known locations of WiFi access points or building floor plans) to estimate a location of the device in real-time. Recording the real-time location estimate at all times (or intervals/increments of time) produces a location history. In some example, the raw sensor data used to determine the location history can be post-processed and improved.

For example, information in the external databases can be updated, such as to update a location of a WiFi access point. Using this new information that was not available at the time the sensor measurements were made, an updated location for that time in the location history can be determined. Specifically, in an example of updated WiFi data, a WiFi access point may be detected by a device in March, but information as to the geographic coordinates of the location of the WiFi access point may have been input into an external database for accurate position for that access point in April, and thus, the device position estimate in the location history at the times in March when that access point was detected can be updated. Other examples of updated information include using building floor plans that were not known before or using precise satellite information that is computed and made available after the fact.

The real-time location estimation is performed using sensor data from that moment or earlier in time to estimate a current location of the device. Within examples, a post-processing technique can also use sensor measurements from later in time to improve estimates of the location at a particular moment.

Figure 4:
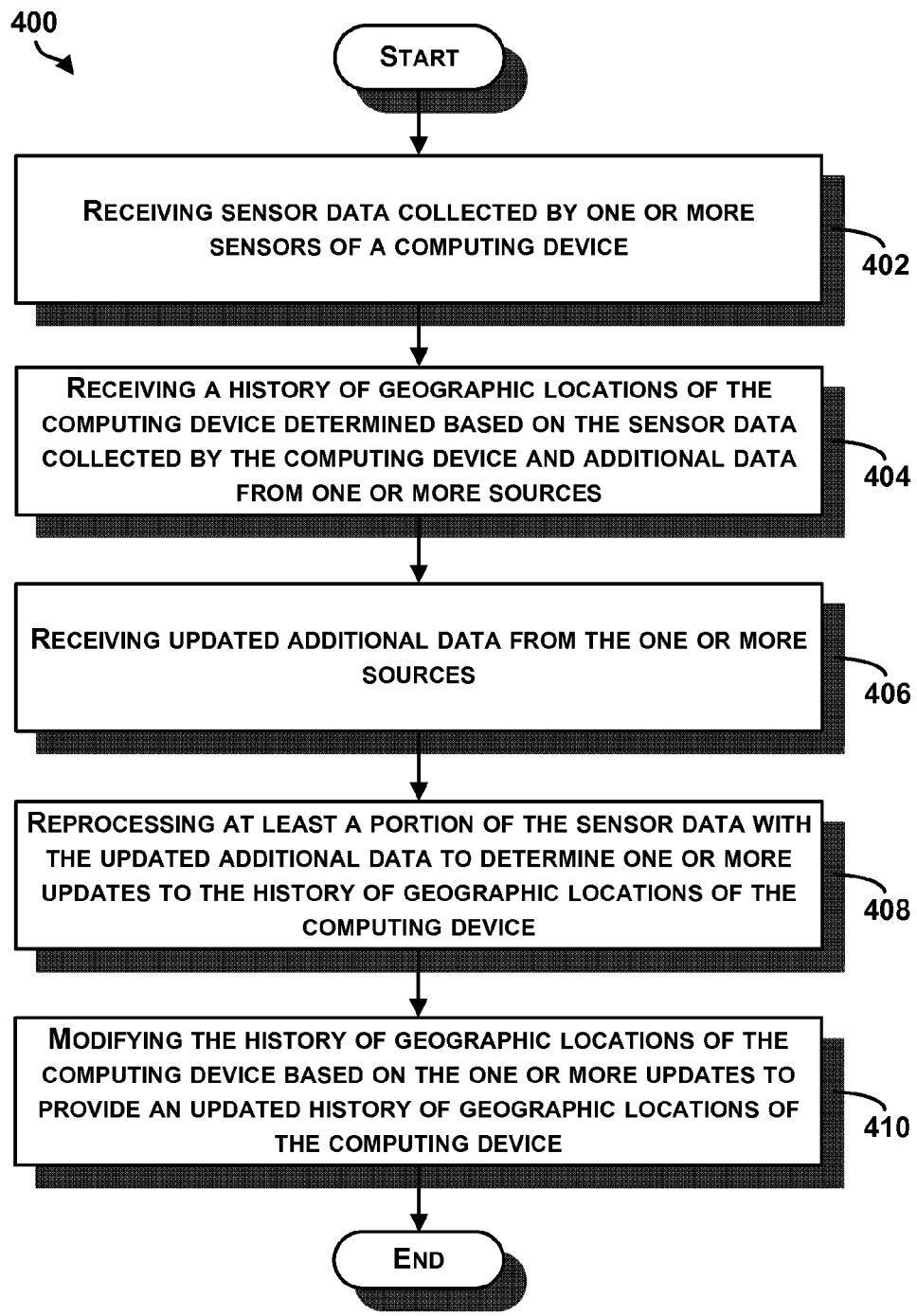
FIG. 4 is a block diagram of an example method modifying a history of geographic locations of a computing device, in accordance with at least some embodiments described herein.

FIG. 4 is a block diagram of an example method modifying a history of geographic locations of a computing device, in accordance with at least some embodiments described herein. Method 400 shown in FIG. 4 presents an embodiment of a method that, for example, could be used with the system 100 in FIG. 1, the device 200 in FIG. 2, or the server 300 in FIG. 3, for example, or may be performed by a combination of any components of the system 100 in FIG. 1, the device 200 in FIG. 2, or the server 300 in FIG. 3. Method 400 may include one or more operations, functions, or actions as illustrated by one or more of blocks 402-410. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 400 and other processes and methods disclosed herein, each block in FIG. 4 may represent circuitry that is wired to perform the specific logical functions in the process.

Functions of the method 400 may be fully performed by a computing device, or may be distributed across multiple computing devices and/or a server. In some examples, the computing device may receive information from sensors of the computing device, or where the computing device is a server the information can be received from another device that collects the information. The computing device could further communicate with a server to determine the matching media files, for example.

At block 402, the method 400 includes receiving sensor data collected by one or more sensors of a computing device. Examples of sensor include data collected from one or more sensors including a WiFi sensor, a GPS sensor, an accelerometer, a gyroscope, or other inertial sensors of a computing device.

At block 404, the method 400 includes receiving a history of geographic locations of the computing device determined based on the sensor data collected by the computing device and additional data from one or more sources. The history of geographic locations may be received from the device that collected the sensor data, or from a server that stores locations of that device. The history of geographic locations of the computing device may be representative of previous real-time locations of the computing device.

At block 406, the method 400 includes receiving updated additional data from the one or more sources. Within examples, the updated additional data may be received from sources such as a database, a server, a network, manual input, or other client devices. The updated additional data may include updated position data of a WiFi access point in a network, updated position data of one or more satellites in a global positioning system (GPS), updated geographical map data, an updated floor plan of a building, or any information not known at the time that the sensor data was collected, for example.

In some examples, the updated additional data may include updated GPS data. For example, locations of satellites may be published at a later time, and determined based on the atmospheric conditions in the location at that time. The raw instantaneous GPS data may not be as accurate as recalculated GPS data, and thus, a more accurate position of satellites can be accessed for post-processing to correct the raw GPS data collected by the sensors.

Updated additional data can also include new or updated floor plans of buildings, new or updated road maps, or new or updated terrain maps. A geographical map may not always be up to date, such as not having information about a newly constructed store, for example, and such information can be used during post-processing to update the location of the computing device.

At block 408, the method 400 includes reprocessing at least a portion of the sensor data with the updated additional data to determine one or more updates to the history of geographic locations of the computing device. For example, using the updated information, an improved or corrected location can be determined based on the collected sensor data. In one instance, a WiFi access point may be detected by a client device and noted by an identifier due to being within range of a coverage area of the WiFi access point. The device may store a time and indication that the WiFi access point was detected, and use this information to access an external source to match the identifier and determine a location of the access point as indicated by the source. The source may have incomplete information or the WiFi access point may have moved and the location may not have been updated yet at the time of collected the scan data. Thus, the scan data can be reprocessed at a later time to determine that the scan data corresponds to a WiFi access point that has had data updated or changed, so as to determine an update to the location history of the computing device.

Within examples, the sensor data can be reprocessed with the updated additional data to determine one or more updates to the history of locations of the computing device using a Viterbi algorithm or a non-linear least-squares algorithm, as described below.

At block 410, the method 400 includes modifying the history of geographic locations of the computing device based on the one or more updates to provide an updated history of geographic locations of the computing device. The updated history of geographic locations can then be stored or sent to the computing device as well.

In some examples, the sensor data includes data collected at different instances in time, and the reprocessing can be performed to reprocess earlier collected data based on the subsequently collected data. For example, the sensor data can be associated with timestamps to identify data for the reprocessing. In addition, based on the timestamps, the method 400 can be performed to identify a time at which there is no sensor data collected, and attempt to estimate a geographic location of the computing device at that time based on given sensor data collected at times prior to and after the time, so as to fill in a gap in a location history.

Within examples, the method 400 also includes receiving data indicating a signal strength of a detected node of a network, and associating the data with the sensor data. For sensor data having an associated signal strength less than a threshold, the sensor data can be identified to be reprocessed. In this example, the sensor data may be less reliable due to a poor signal strength upon collection of the data, and any associated geographic location determined based on the less reliable sensor data can be marked for reprocessing.

Similarly, received sensor data can be marked for reprocessing in other ways as well. For example, sensor data may be collected by sensors based on detection of a single type of node of a network or based on a number of nodes of the network less than an threshold number, and such sensor data can be identified to be reprocessed. If the sensor data includes only WiFi scan data, and no other associated sensor data such as GPS or inertial sensor data for a given time, then an associated geographic location determined based only on one type of data may be considered less reliable than being determined on multiple types of data.

In further examples, the method 400 may also include determining a level of trustworthiness or confidence of the received sensor data. For example, if the sensor data includes both GPS and WiFi data, and each indicate contradicting locations, the sensor data may be identified for reprocessing. Any indication of a conflict among the received sensor data may provide a reason to reprocess the data.

Within examples, using the method 400 of FIG. 4, improved location history of a device can be determined by reprocessing the sensor data after the fact. The external sources that store WiFi access point data, GPS satellite data, etc., may not always be up to date, and thus, the method 400 may additionally include querying the sources to identify a date that the source was last updated to determine if new data is available for use in the reprocessing.

Figures 5A, 5B:
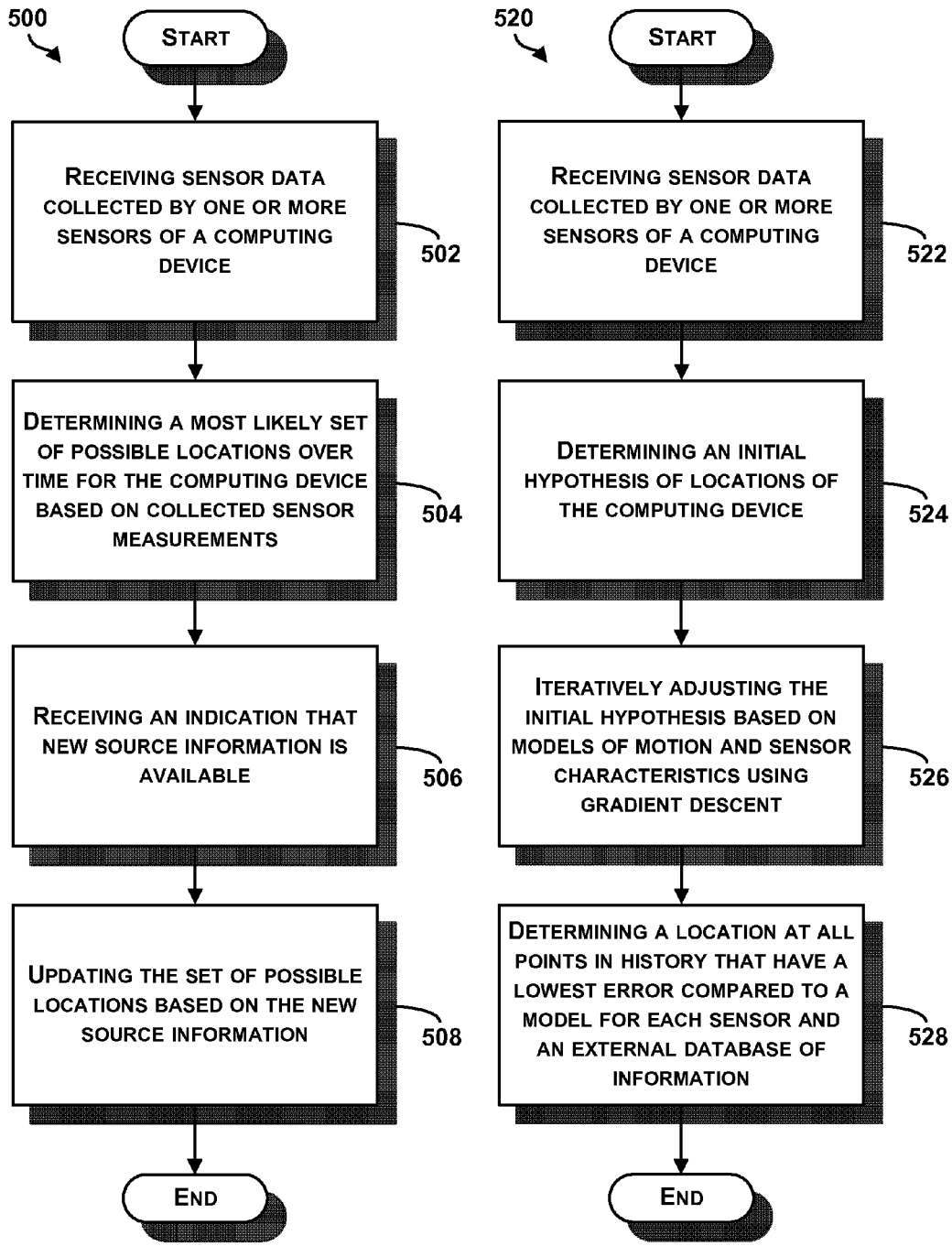
FIGS. 5A-5B are block diagrams of example methods for reprocessing the sensor data, in accordance with at least some embodiments described herein.

Sensor data may be reprocessed using any number of techniques. FIGS. 5A-5B are block diagrams of example methods for reprocessing the sensor data, in accordance with at least some embodiments described herein. Methods 500 and 520 shown in FIGS. 5A-5B present embodiments of methods that, for example, could be used with the system 100 in FIG. 1, the device 200 in FIG. 2, or the server 300 in FIG. 3, for example, or may be performed by a combination of any components of the system 100 in FIG. 1, the device 200 in FIG. 2, or the server 300 in FIG. 3.

In some examples, FIG. 5A illustrates functions of a Viterbi algorithm used to reprocess sensor data. At block 502, the method 500 includes receiving sensor data collected by one or more sensors of a computing device. At block 504, the method 500 includes determining a most likely set of possible locations over time for the computing device based on collected sensor measurements. At block 506, the method 500 includes receiving an indication that new source information is available. At block 508, the method 500 includes updating the set of possible locations based on the new source information.

In some examples, the Viterbi algorithm may be used to divide a physical space into a graph of locations with edges indicating possible movement between locations. For example, a building may be defined as having nodes for each room and corridor in the building, and edges indicate possible pathways to move through the building based on locations of doors. The Viterbi algorithm computes a most likely path through the graph based on collected sensor measurements. In a specific example, a building may include two businesses, and as the computing device moves through the building, sensor measurements from WiFi may appear similar in location and can be difficult to distinguish as to an exact location to determine which business the computing device in. At a later time, movement up stairs can be detected by an accelerometer signal in the computing device. Based on reference to a floor plan, it may be determined that only one of the businesses has stairs, and from this new information, the Viterbi algorithm adjusts a likelihood of the two formerly ambiguous location histories to identify one where the computing device entered a business with the stairs as more likely. A set of most likely possible location histories can be maintained and updated each time new information is provided. Thus, a sensor measurement later in time can correct a location estimate from an earlier time.

In some examples, FIG. 5B illustrates functions of a non-linear least-squares solver to perform smoothing and mapping used to reprocess sensor data. At block 522, the method 520 includes receiving sensor data collected by one or more sensors of a computing device. At block 524, the method 520 includes determining an initial hypothesis of locations of the computing device (e.g., which may include locations along a projected trajectory of the computing device). At block 526, the method 520 includes iteratively adjusting the initial hypothesis based on models of motion and sensor characteristics using gradient descent. At block 528, the method 520 includes determining a location at all points in history (covering a specified time) that have a lowest error compared to a model for each sensor and an external database of information.

In some examples, the non-linear least-squares solver may be used to estimate location positions in continuous space. All sensor measurements may be input and a location at all points in history can be determined that have a lowest error compared to a model for each sensor and an external database of information, such as WiFi access point positions. A full trajectory can be estimated jointly and uncertainties and noise inherent in sensor measurements may be taken into account. Initially, a guess of a trajectory is used (e.g., such as from GPS or best guess of position for each individual WiFi scan, and the initial guess is iteratively adjusted by moving each location guess in the history in a direction that better fits all of the models of motion and sensor characteristics using gradient descent. Eventually, positions are moved to a local minima where a location history may not be adjusted any more without making an estimate worse. A final result is an estimate for the location history taking into account measurements from the entire history.

Figure 6:
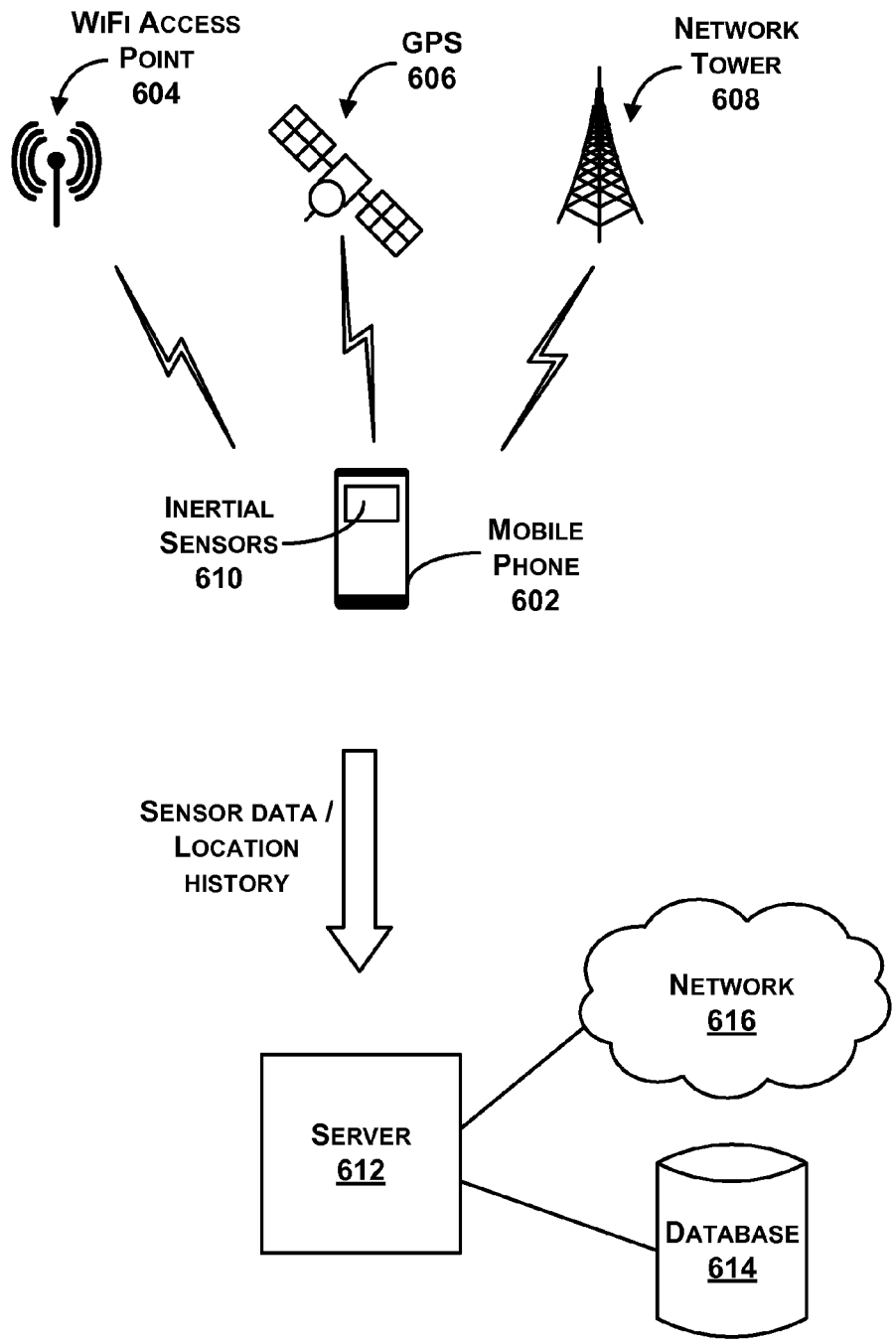
FIG. 6 is a block diagram illustrating an example system configured to modify a location history of a computing device.

FIG. 6 is a block diagram illustrating an example system configured to modify a location history of a computing device. The system includes a mobile phone 602 configured to communicate with or detect a WiFi access point 604, a component of a GPS system 606, and a network tower 608. The mobile phone 602 may further include internal inertial sensors 610. The mobile phone 602 may utilize any of these components to determine a real-time instantaneous location of the mobile phone 602, and may store the collected sensor data, and a compiled location history of the mobile phone 602.

The mobile phone 602 may communicate with a server 612 to provide a copy of the collected sensor data and the location for reprocessing at a later time. The server 612 may access a database 614 that stores information such as locations of WiFi access points, published data of GPS satellites, up-to-date geographical road maps, etc., and may access a network 616 to gain access to other external sources of information as well. The server 612 may be configured to performed methods to reprocess the sensor data (such as methods shown in FIGS. 5A-5B) with updated location information so as to improve or correct the location history of the mobile phone 602.

Using methods described herein, improved location history of a device can be performed. Knowing a location history enables personalized assistance to be provided to the computing device. For example, location-based services can offer personalized recommendations and assistance based on places typically visited, and the more accurate the history, the better these personalized systems will be.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving sensor data collected by one or more sensors of a computing device and a timestamp indicative of a time at which the sensor data was collected by the one or more sensors of the computing device;
    receiving a history of geographic locations of the computing device determined based on the sensor data collected by the computing device and additional data from one or more sources;
    receiving updated additional data from the one or more sources, wherein the updated additional data corresponds to (i) updated position data of wireless nodes associated with the time at which the sensor data was collected by the one or more sensors of the computing device or (ii) updated location information associated with a location at which the sensor data was collected by the one or more sensors of the computing device;
    reprocessing at least a portion of the sensor data with the updated additional data to determine one or more updates to the history of geographic locations of the computing device; and
    modifying the history of geographic locations of the computing device based on the one or more updates to provide an updated history of geographic locations of the computing device.

2. The method of claim 1, wherein receiving sensor data collected by the one or more sensors of the computing device comprises receiving data collected from one or more sensors including a WiFi sensor, a global positioning system (GPS) sensor, an accelerometer, and a gyroscope.

3. The method of claim 1, wherein the history of geographic locations of the computing device is representative of previous real-time locations of the computing device.

4. The method of claim 1, wherein receiving the updated additional data from the one or more sources comprises receiving updated position data of a WiFi access point in a network.

5. The method of claim 1, wherein receiving the updated additional data from the one or more sources comprises receiving updated position data of one or more satellites in a global positioning system (GPS).

6. The method of claim 1, wherein receiving the updated additional data from the one or more sources comprises receiving updated geographical map data.

7. The method of claim 1, wherein receiving the updated additional data from the one or more sources comprises receiving an updated floor plan of a building.

8. The method of claim 1, wherein reprocessing at least a portion of the sensor data with the updated additional data to determine one or more updates to the history of geographic locations of the computing device comprises processing based on a Viterbi algorithm or a non-linear least-squares algorithm.

9. The method of claim 1, wherein the sensor data comprises first data collected at a first instance in time and second data collected at a subsequent instance in time, and the method further comprises:
    reprocessing the first data based on the second data to determine one or more updates to the history of geographic locations of the computing device.

10. The method of claim 1, wherein the sensor data is associated with timestamps, and wherein the method further comprises:

determining a time between a first timestamp and a second timestamp at which there is no sensor data collected; and estimating a geographic location of the computing device at the time based on given sensor data collected at times prior to and after the time.

11. The method of claim 1, wherein receiving sensor data collected by one or more sensors of the computing device further comprises receiving a signal strength of a detected one or more nodes of a network, and the method further comprises:

determining given sensor data collected based on a given signal strength less than a threshold; and identifying such given sensor data to be reprocessed.

12. The method of claim 1, further comprising:

determining that given sensor data collected by one or more sensors of the computing device is based on detection of a single type of node of a network; and identifying such given sensor data to be reprocessed.

13. The method of claim 1, further comprising:

determining that given sensor data collected by one or more sensors of the computing device is based on detection of a number of nodes of a network being less than a threshold number; and identifying such given sensor data to be reprocessed.

14. A non-transitory computer-readable medium having stored therein instructions, that when executed by a device, cause the device to perform functions comprising:

receiving sensor data collected by one or more sensors of a computing device and a timestamp indicative of a time at which the sensor data was collected by the one or more sensors of the computing device;

receiving a history of geographic locations of the computing device determined based on the sensor data collected by the computing device and additional data from one or more sources;

receiving updated additional data from the one or more sources, wherein the updated additional data corresponds to (i) updated position data of wireless nodes associated with the time at which the sensor data was collected by the one or more sensors of the computing device or (ii) updated location information associated with a location at which the sensor data was collected by the one or more sensors of the computing device;

reprocessing at least a portion of the sensor data with the updated additional data to determine one or more updates to the history of geographic locations of the computing device; and modifying the history of geographic locations of the computing device based on the one or more updates to provide an updated history of geographic locations of the computing device.

15. The non-transitory computer-readable medium of claim 14, wherein receiving the updated additional data from the one or more sources comprises receiving one or more of updated position data of a WiFi access point in a network, updated position data of one or more satellites in a global positioning system (GPS), updated geographical map data, and an updated floor plan of a building.

16. The non-transitory computer-readable medium of claim 14, wherein the sensor data comprises first data collected at a first instance in time and second data collected at a subsequent instance in time, and the functions further comprise:

reprocessing the first data based on the second data to determine one or more updates to the history of geographic locations of the computing device.

17. The non-transitory computer-readable medium of claim 14, wherein the sensor data is associated with timestamps, and wherein the functions further comprise:

determining a time between a first timestamp and a second timestamp at which there is no sensor data collected; and estimating a geographic location of the computing device at the time based on given sensor data collected at times prior to and after the time.

18. A device, comprising:

a processor; and a computer-readable medium, configured to store instructions, that when executed by the processor, cause the device to perform functions comprising:

receiving sensor data collected by one or more sensors of a computing device and a timestamp indicative of a time at which the sensor data was collected by the one or more sensors of the computing device;

receiving a history of geographic locations of the computing device determined based on the sensor data collected by the computing device and additional data from one or more sources;

receiving updated additional data from the one or more sources, wherein the updated additional data corresponds to (i) updated position data of wireless nodes associated with the time at which the sensor data was collected by the one or more sensors of the computing device or (ii) updated location information associated with a location at which the sensor data was collected by the one or more sensors of the computing device;

reprocessing at least a portion of the sensor data with the updated additional data to determine one or more updates to the history of geographic locations of the computing device; and modifying the history of geographic locations of the computing device based on the one or more updates to provide an updated history of geographic locations of the computing device.

19. The device of claim 18, wherein receiving sensor data collected by one or more sensors of the computing device further comprises receiving a signal strength of a detected one or more nodes of a network, and the functions further comprise:

determining given sensor data collected based on a given signal strength less than a threshold; and identifying such given sensor data to be reprocessed.

20. The device of claim 18, wherein the functions further comprise:

determining that given sensor data collected by one or more sensors of the computing device is based on detection of a single type of node of a network; and identifying such given sensor data to be reprocessed.

* * * * *